(12) United States Patent
Stefanelli

(10) Patent No.: US 9,192,220 B2
(45) Date of Patent: Nov. 24, 2015

(54) CONTAINER FOR FLUID PRODUCTS, IN PARTICULAR PERFUMES, DEODORANTS, CREAMS AND SIMILAR

(76) Inventor: Paolo Stefanelli, Milan (IT)

( * ) Notice: Subject to any disclaimer, the term of this patent is extended or adjusted under 35 U.S.C. 154(b) by 1062 days.

(21) Appl. No.: 12/864,869

(22) PCT Filed: Jan. 28, 2008

(86) PCT No.: PCT/IT2008/000045
§ 371 (c)(1),
(2), (4) Date: Oct. 7, 2010

(87) PCT Pub. No.: WO2009/095937
PCT Pub. Date: Aug. 6, 2009

(65) Prior Publication Data
US 2011/0025508 A1 Feb. 3, 2011

(51) Int. Cl.
*G08B 13/14* (2006.01)
*B67D 7/60* (2010.01)
*B23P 19/04* (2006.01)
(Continued)

(52) U.S. Cl.
CPC ............... *A45D 34/00* (2013.01); *A45D 34/04* (2013.01); *A47J 31/46* (2013.01); *G08B 13/2445* (2013.01); *A45D 2200/057* (2013.01); *B65D 75/5805* (2013.01); *B65D 2101/00* (2013.01); *B65D 2101/0007* (2013.01); *B65D 2203/10* (2013.01); *G06K 19/0776* (2013.01); *G06K 19/07798* (2013.01); *G09F 3/0292* (2013.01); *G09F 3/0335* (2013.01); *Y10T 29/49826* (2015.01)

(58) Field of Classification Search
CPC .. B65D 2203/10; B65D 55/028; B65D 55/06; B65D 75/5805; B65D 2101/0007; B65D 33/2516; B65D 55/0827; G06K 19/07798; G06K 19/0776; G06K 2017/0064; G09F 3/0341; G09F 3/0335; G09F 3/0292; Y10S 215/901; Y10T 70/5004
See application file for complete search history.

(56) References Cited

U.S. PATENT DOCUMENTS 5,790,029 A 8/1998 Curnutte et al.
5,884,425 A * 3/1999 Baldwin ............... G09F 3/0292
283/101
(Continued)

FOREIGN PATENT DOCUMENTS

DE 102004040831 3/2006
EP 1837798 9/2007
(Continued)

OTHER PUBLICATIONS

PCT International Search Report for PCT/IT2008/000429 filed on Jun. 25, 2008 in the name of Stefanelli, Paolo.
(Continued)

*Primary Examiner* — Benjamin C Lee
*Assistant Examiner* — Rajsheed Black-Childress
(74) *Attorney, Agent, or Firm* — Steinfl & Bruno LLP

(57) ABSTRACT

A container for fluid products, in particular perfumes, deodorants, creams and the like, comprising: a holding body (2) for containing a fluid (6), preferably a perfume, deodorant or the like; a dispensing member (3) associated with said holding body (2) and having a duct (4) for drawing said fluid (6) and a dispensing head (5) to deliver the fluid drawn by said duct (4), said dispensing head (5) being at least partly inserted in said holding body (2). The container (1) further comprises a transponder device (8) mounted on said dispensing head (5) internally of said holding body (2).

13 Claims, 2 Drawing Sheets

Figure 1:
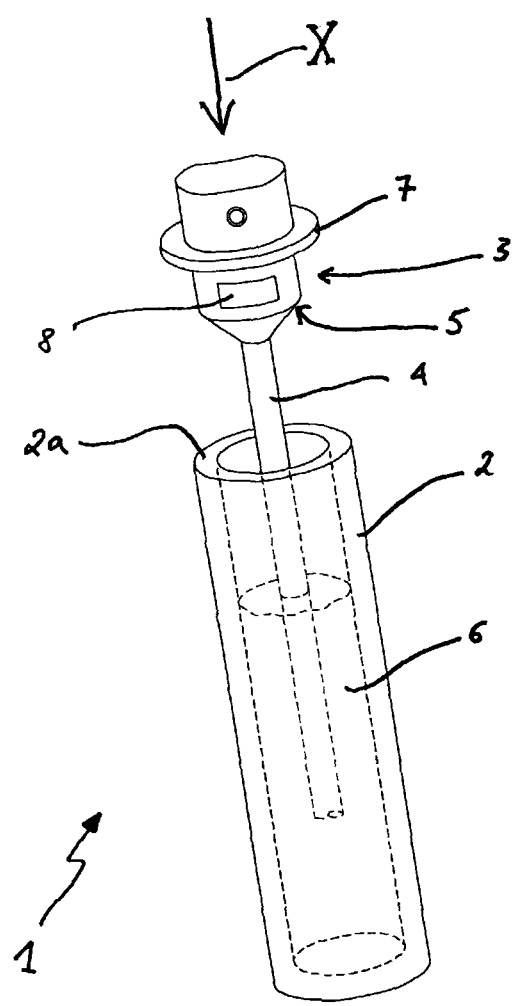

(51) Int. Cl.
  *B05B 11/00* (2006.01)
  *A45D 34/00* (2006.01)
  *A45D 34/04* (2006.01)
  *A47J 31/46* (2006.01)
  *G08B 13/24* (2006.01)
  *G09F 3/00* (2006.01)
  *G09F 3/03* (2006.01)
  *B65D 75/58* (2006.01)
  *G06K 19/077* (2006.01)

(56) References Cited

U.S. PATENT DOCUMENTS

| | | | | |
|---|---|---|---|---|
| 6,050,622 | A * | 4/2000 | Gustafson | E06B 9/68 292/307 R |
| 6,137,413 | A * | 10/2000 | Ryan, Jr. | G08B 13/2434 340/572.1 |
| 6,641,052 | B2 * | 11/2003 | Choko et al. | B65D 39/0011 215/250 |
| 7,009,519 | B2 | 3/2006 | Leonard et al. | |
| 7,034,689 | B2 * | 4/2006 | Teplitxky | B65D 55/06 340/572.1 |
| 7,048,179 | B2 * | 5/2006 | Claessens | G06Q 20/207 235/375 |
| 7,486,188 | B2 * | 2/2009 | Van Alstyne | G06Q 10/08 340/10.1 |
| 7,701,346 | B2 * | 4/2010 | Lindsay | G06K 19/0716 340/539.26 |
| 8,368,539 | B2 * | 2/2013 | Adstedt | B65D 55/028 340/572.1 |
| 8,674,834 | B2 * | 3/2014 | Phaneuf | B65D 53/04 215/201 |
| 2003/0109068 | A1 | 6/2003 | Garcia et al. | |
| 2005/0051624 | A1 * | 3/2005 | Kipp | B65D 51/24 235/385 |
| 2006/0001525 | A1 | 1/2006 | Nitzan et al. | |
| 2006/0109192 | A1 | 5/2006 | Weigand | |
| 2006/0157369 | A1 | 7/2006 | Fresnel | |
| 2006/0186995 | A1 | 8/2006 | Wu et al. | |
| 2006/0187039 | A1 * | 8/2006 | Bui et al. | 340/572.1 |
| 2006/0289679 | A1 | 12/2006 | Johnson et al. | |
| 2007/0008140 | A1 | 1/2007 | Saarisalo et al. | |
| 2007/0029382 | A1 * | 2/2007 | Baker et al. | 235/385 |
| 2007/0069895 | A1 * | 3/2007 | Koh | G06K 19/02 340/572.1 |
| 2007/0095925 | A1 | 5/2007 | Zhu et al. | |
| 2007/0126580 | A1 * | 6/2007 | Roth | 340/572.1 |
| 2007/0139205 | A1 * | 6/2007 | Tanaka | G06K 19/073 340/572.8 |
| 2007/0188329 | A1 | 8/2007 | Garcia et al. | |
| 2007/0214055 | A1 | 9/2007 | Temko | |
| 2007/0250707 | A1 | 10/2007 | Noguchi | |
| 2007/0296599 | A1 * | 12/2007 | Wang | B65D 55/028 340/572.8 |
| 2008/0061986 | A1 | 3/2008 | Ficker et al. | |
| 2008/0069736 | A1 * | 3/2008 | Mingerink | B05B 11/0005 422/400 |
| 2008/0191884 | A1 | 8/2008 | Garcia et al. | |
| 2010/0177993 | A1 * | 7/2010 | Chen | B65D 33/2533 383/207 |
| 2012/0067374 | A1 * | 3/2012 | Raspati | B65D 33/2516 134/21 |

FOREIGN PATENT DOCUMENTS

| | | |
|---|---|---|
| FR | 2864035 | 6/2005 |
| FR | 2876200 | 4/2006 |
| WO | 2004/049237 | 6/2004 |
| WO | 2006/079904 | 8/2006 |
| WO | 2006-097760 | 9/2006 |
| WO | 2006/131545 | 12/2006 |

OTHER PUBLICATIONS

PCT Written Opinion for PCT/IT2008/000429 filed on Jun. 25, 2008 in the name of Stefanelli, Paolo.
PCT International Search Report for PCT/IT2008/000045 filed on Jan. 28, 2008 in the name of Stefanelli, Paolo.
PCT Written Opinion for PCT/IT2008/000045 filed on Jan. 28, 2008 in the name of Stefanelli, Paolo.
European Communication 94(3) mailed on Oct. 29, 2013 for EP Application 08790018-9 filed on Oct. 7, 2010 in the name Paolo Stefanelli.
United States Non-Final Office Action mailed on Jun. 20, 2013 for U.S. Appl. No. 12/864,868, filed Oct. 7, 2010 in the name of Paolo Stefanelli.
United States Non-Final Office Action mailed on Mar. 11, 2014 for U.S. Appl. No. 12/864,868, filed Oct. 7, 2010 in the name of Paolo Stefanelli.
Non-Final Office Action mailed on Jan. 28, 2015 for U.S. Appl. No. 12/864,868, filed Oct. 7, 2010 in the name of Paoli Stefanelli.

* cited by examiner

CONTAINER FOR FLUID PRODUCTS, IN PARTICULAR PERFUMES, DEODORANTS, CREAMS AND SIMILAR

CROSS REFERENCE TO RELATED APPLICATIONS

The present application is the US national stage of International Application PCT/IT2008/000045 filed on Jan. 28, 2008. The present application may be related to U.S. application Ser. No. 12/864,868 which is the US national stage of International Application PCT/IT2008/000429.

It is known that currently utilised on containers to be marketed and in particular containers for cosmetic and pharmaceutical products are plates having a dual purpose, i.e. reproducing brand, model, price and other possible descriptive data of the product and preventing said containers from being stolen or in any case removed in an illicit and uncontrolled manner from the area where they should be positioned.

The antitheft or anti-shoplifting action is obtained due to a circuit housed within the plate; this circuit generally comprises a memory; contained in the memory is an identification code of the product, a transmission module, for generating a signal incorporating at least such an identification code, and an antenna for transmitting said signal.

As far as the container and related plate are in a suitably monitored predetermined area, the circuit talks to the monitoring system at a predetermined frequency, so that said system can have a continuous confirmation about the presence of the product in the predetermined area.

As soon as the system does no longer detect the presence of the plate (and therefore very likely of the container associated therewith), it generates a suitable signal for trackability of such an absence.

If then the absence of the container corresponds to registration of a sale operation, the system's control activity will terminate.

If, on the contrary, no sale operation corresponds to the absence of the plate, the system will generate an alarm signal for signalling the anomalous situation.

Therefore, in the above mentioned technical field, greatly felt is the necessity to fasten the plate to the container in a quick, reliable and cheap manner.

Accordingly, it is an aim of the present invention to provide a container for fluid products, in particular perfumes, deodorants and the like, in which the plate is secured in a safe and reliable manner to the container itself.

Another aim of the invention is to provide a container for fluid products in which the plate is fastened to the container in a simple and cheap manner.

A further aim of the invention is to make available a container for fluid products where affixing of the plate does not alter the quality of the product present inside the container itself.

The foregoing and further aims are substantially achieved by a container for fluid products according to the features recited in the appended claims.

Further features and advantages will become more apparent from the detailed description of a preferred but not exclusive embodiment of a container in accordance with the invention.

Figure 2:
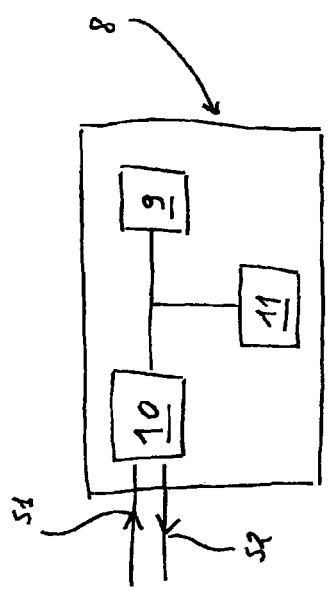
Figure 3:
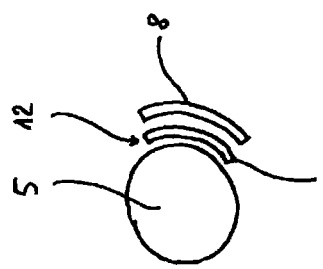
Figure 4:
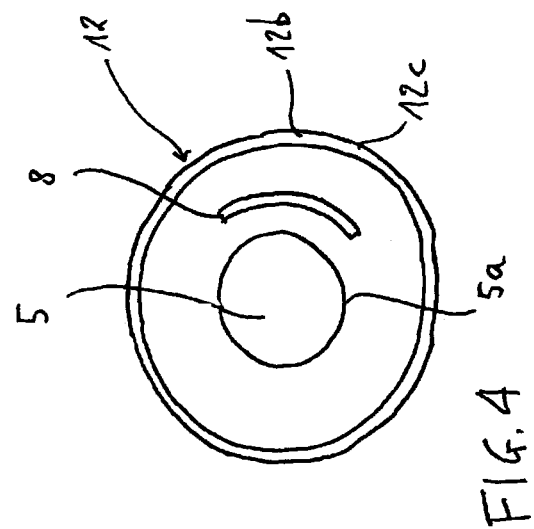

This description will be set out with reference to the accompanying drawings, given by way of non-limiting example, in which:

FIG. 1 diagrammatically shows a perspective view of a container according to the invention;

FIG. 2 is a block diagram of a device being part of the container seen in FIG. 1;

FIGS. 3 and 4 diagrammatically show possible assembling modes of the device seen in FIG. 2 to the container of FIG. 1.

With reference to the drawings, a container for fluid products in accordance with the present invention has been generally identified by reference numeral 1.

Container 1 can be a small bottle or a vessel, for example, which is able to contain goods in a liquid or semifluid form such as perfumes, deodorants, foams, gels, etc.

Preferably, the present invention applies to advantage in the sector of perfumes having a high commercial value. However, it will be understood that the present invention can be used for any container adapted to hold fluid products of various kinds.

Container 1 (FIG. 1) first of all comprises a holding body 2 to contain a fluid, such as one of the above specified products. By way of example, the holding body can have a cylindrical shape, as diagrammatically shown in FIG. 1.

Container 1 further comprises a dispensing member 3, associated with the holding body 2 and having a duct 4 and a distribution or dispensing head 5. The task of duct 4 is to draw the fluid 6 present within the holding body 2. To this aim, duct 4 is preferably at least partly dipped in the fluid 6 contained in the holding body 2.

The dispensing head 5 is operatively associated with duct 4 to deliver the fluid drawn through the duct 4 itself. Preferably the dispensing head 5 comprises pump means for exerting a predetermined pressure in order to draw and deliver the fluid contained in said holding body 2.

In the preferred embodiment, the dispensing head 5 and related pump means are activated following operation from the outside by a user, in the direction identified by arrow "X".

The dispensing head is at least partly inserted in the holding body. However, in the view in FIG. 1 the dispensing head 5 is fully external to the holding body 2 for better representing the structure of container 1.

When container 1 is fully assembled, a flange 7 of the dispensing head 5 is in contact with an upper edge 2a of the holding body 2, so that the dispensing head is really inserted, at least partly, in the holding body 2 itself.

Container 1 further comprises a transponder device 8 mounted on the dispensing head 5 at the inside of the holding body 2. Preferably, the transponder device 8 is provided with a memory 9 to store the main data representative of container 1 and/or fluid 6 contained therein.

By way of example, the main data can comprise an identification code to identify container 1, so that the same can be uniquely detected among other containers holding the same fluid.

Preferably the transponder device 8 is further provided with an antenna 10 operatively associated with memory 9 for receiving at least one request signal S1 and transmit at least one corresponding answerback signal S2.

The request signal S1 is a signal generated by the monitoring/supervising system with which the transponder device 8 co-operates.

If the system, upon generation of the request signal S1 does not receive any answerback signal S2, it will generate a suitable alarm, since the absence of a given TAG (i.e. a given transponder device) is detected and it is therefore possible for the respective container to have been stolen or in any case removed from the monitoring area in an unauthorised manner.

Preferably, said answerback signal S2 incorporates at least some of said main data and preferably said identification code.

In the preferred embodiment the transponder device 8 further comprises a transmission module 11, operatively connected to memory 9 and antenna 10 to generate the answerback signal S2.

By way of example, the transponder device 8 can be made in the form of an ISO TAG operating at 13.56 MHz, or a UHF TAG operating at specific and authorised frequencies for each country; this can be in particular very useful in case of readings at very long distances.

The transponder device 8 can be also made in the form of an LF TAG, operating at 125 KHz, for example.

The transponder device 8 can be also provided to be a transponder using the "near field" technology enabling reading in liquids and on metals too.

At all events, the transponder is in compliance with the EPC coding of GS1, to ensure interoperability of the transponder in the observance of the present or future encoding and reading rules of transponders.

Advantageously, the transponder device 8 is able to correctly operate even if one or more of the elements forming it (memory 9, antenna 10 and preferably transmission module 11) is placed in contact with liquid or fluid substances, and/or if transmission/reception of the request/answerback signals, S1 and S2, is to occur at least partly inside a liquid or fluid substance.

In this manner operation of the transponder device 8 is not impaired even if the transponder device 8 is fully or partly dipped in fluid 6.

Preferably, the transponder device 8 is mounted on the dispensing head 5 through a material 12 that does not alter the olfactory features of fluid 6 contained in the holding body 2.

According to a first embodiment (FIG. 3), this material 12 is an adhesive material 12a interposed between the transponder device 8 and the dispensing head 5.

By way of example, the adhesive material 12a can be any glue or sticky paper enabling the transponder to be definitively fastened to the holding body 2.

In a second embodiment (FIG. 4); said material 12 is a heat-shrinkable material 12b, and in particular any heat-shrinkable plastic material.

In the preferred embodiment, an annular element 12c is made using the above mentioned heat-shrinkable material 12b, which annular element is externally positioned around the dispensing head 5, so that the transponder device 8 is maintained in a fastened relationship with the dispensing head 5 itself.

In the embodiment in FIG. 4, the transponder device 8 is interposed between the annular element 12c and the outer surface 5a of the dispensing head 5. By way of example, the dispensing head 5 can have a substantially cylindrical conformation provided with a lateral surface 5a, and the annular element is disposed at a radially external position relative to said lateral surface 5a.

Preferably, both in case of use of adhesive material 12a and in case of use of heat-shrinkable material 12b, the transponder device 8 has a substantially laminar or plate-shaped conformation.

In this manner, the transponder device 8 can be suitably deformed so as to make it adhere to the dispensing head 5.

In particular, in case of use of the heat-shrinkable material 12b, memory 9, antenna 10 and preferably the transmission module 11 are directly done on the heat-shrinkable material 12b itself, so as to facilitate application of the transponder device 8 to the dispensing head 5.

It should be noted that the transponder device can be directly done either on the radially internal surface of the annular element 12c (i.e. on the surface facing the dispensing head 5), or on the radially external surface of the annular element 12c (i.e. the surface opposite to the radially internal surface).

In more detail, in case of use of an adhesive material 12a, the following steps can be performed in order to engage the transponder device 8 to the dispensing head 5:

applying the adhesive material 12a to the dispensing head 5 and/or the transponder device 8;

bringing the dispensing head 5 and the transponder device 8 into contact with each other in such a manner that the adhesive material 12a interposed therebetween can perform its fastening action.

In case of use of a heat-shrinkable material 12b on the contrary, the following steps can be performed:

providing the annular element 12c;

positioning the annular element 12c at an external location relative to the dispensing head 5; in particular, during this step, the annular element 12c has a diameter or inner size greater than, or only slightly greater than, the diameter or outer size of the dispensing head 5, so that it can surround the dispensing head 5; practically, the annular element 12c has sizes enabling it to be fitted on the dispensing head 5 without too great an effort being required;

associating memory 9, antenna 10 and preferably transmission module 11 with the annular element 12c;

heating the annular element 12c so that the same reduces its sizes and, by shrinkage around the dispensing head 5, allows engagement between the transponder device 8 and dispensing head 5.

It will be recognised that the step of associating the transponder device 8 with the annular element 12c can be performed in different manners:

interposing the transponder device 8 between the annular element 12c and the dispensing head 5, so that, when shrinkage of the annular element 12c occurs, the transponder device 8 keeps in engagement both with the annular element 12c itself and with the dispensing head 5;

obtaining the transponder device 8 directly on the radially internal surface of the annular element 12c;

obtaining the transponder device 8 directly on the radially external surface of the annular element 12c.

The invention achieves important advantages.

First of all, in the container according to the invention the transponder device is fastened to said container in a safe and reliable manner.

In addition, the transponder device is fastened to the container in a simple and cheap manner.

Another advantage resides in that affixing of the transponder device does not alter the quality of the fluid present within the container.

A further advantage consists in that the transponder device cannot be dissociated from the container without damaging it. This allows use of these devices in order to control possible imitations or counterfeited products, and/or to follow all the logistics steps of same (tracking activity).

The invention claimed is:

1. A container for counterfeit prevention of fluid products, comprising:

a cylindrical holding body for containing a fluid, the cylindrical holding body having an inner surface with a first diameter;

a dispensing member associated with the cylindrical holding body and including
a duct to draw the fluid, and a cylindrical dispensing head to deliver the fluid drawn from the duct, the cylindrical dispensing head having an outer surface with a second diameter, the cylindrical dispensing head being at least partly inserted concentrically inside the cylindrical holding body; and a transponder device mounted on a portion of the outer surface of the cylindrical dispensing head being inside the cylindrical holding body, wherein the transponder device is mounted on the cylindrical dispensing head through a heat-shrinkable material, wherein the transponder device includes a memory and an antenna, wherein the memory and the antenna are provided on the heat-shrinkable material such that the portion of the outer surface of the cylindrical dispensing head with the heat-shrinkable material and the transponder device has a third diameter, and wherein the first diameter of the cylindrical holding body and the third diameter of cylindrical dispensing head with the heat-shrinkable material and transponder device are configured so that the transponder device cannot be dissociated from the cylindrical holding body without damaging the transponder device during an attempted withdrawal of the cylindrical dispensing head with the mounted transponder device and heat-shrinkable material from the cylindrical holding body.

2. The container as claimed in claim 1, wherein said dispensing head includes a pump means to exert a predetermined pressure to draw and deliver the fluid contained in said holding body.

3. The container as claimed in claim 1, wherein
said memory stores main data representative of the fluid and/or the container;
said antenna is operatively associated with said memory to receive at least one request signal and transmit at least one corresponding answerback signal, the latter incorporating at least some of said main data.

4. The container as claimed in claim 1, wherein said heat-shrinkable material is shaped as an annular element mounted at an external position on said dispensing head.

5. The container as claimed in claim 1, wherein said transponder device has a laminar or plate-shaped conformation.

6. A process for associating a transponder device with a container for counterfeit prevention of fluid products, comprising:
providing a container, including
a cylindrical holding body for containing a fluid, the cylindrical holding body having an inner surface with a first diameter, and
a dispensing member associated with the cylindrical holding body and having a duct to draw the fluid and a cylindrical dispensing head to deliver the fluid drawn by the duct, the cylindrical dispensing head being at least partly inserted concentrically inside the cylindrical holding body, wherein the cylindrical dispensing head has an outer surface with a second diameter;
providing a transponder device having a memory and an antenna; and
mounting the transponder device on the cylindrical dispensing head inside the cylindrical holding body through a heat-shrinkable material,
wherein providing a transponder device includes providing the memory and the antenna on the heat-shrinkable material, such that the portion of the outer surface of the cylindrical dispensing head with the heat-shrinkable material and the transponder device has a third diameter, and
wherein the first diameter of the cylindrical holding body and the third diameter of cylindrical dispensing head with the heat-shrinkable material and transponder device are configured so that the transponder device cannot be dissociated from the cylindrical holding body without damaging the transponder device during an attempted withdrawal of the cylindrical dispensing head with the mounted transponder device and heat-shrinkable material from the cylindrical holding body.

7. The process as claimed in claim 6, wherein mounting said transponder device on said dispensing head includes
providing an annular element made of said heat-shrinkable material;
positioning said annular element outside said dispensing head;
associating at least said memory and said antenna with said annular element; and
heating at least said annular element for engaging said memory and said antenna to said dispensing head.

8. The process as claimed in claim 6, wherein said transponder device has a substantially laminar or plate-shaped conformation.

9. The container as claimed in claim 1, where the fluid is a perfume, deodorant or similar.

10. The container as claimed in claim 4, wherein said transponder device is provided on the radially internal surface of the annular element.

11. The container as claimed in claim 4, wherein said transponder device is provided on the radially external surface of the annular element.

12. A container for counterfeit prevention of fluid products, comprising:
a cylindrical holding body, the cylindrical holding body having an inner surface with a first diameter;
a dispensing member associated with the cylindrical holding body, the dispensing member including a duct and a dispensing head with cylindrical conformation and with an outer surface having a second diameter, wherein the cylindrical dispensing head being at least partly inserted concentrically inside the cylindrical holding body; and
a transponder device disposed inside the cylindrical holding body and mounted on a portion of the outer surface of the cylindrical dispensing head,
wherein the transponder device is provided on an annular heat-shrinkable material such that the portion of the outer surface of the cylindrical dispensing head with the heat-shrinkable material and transponder device has a third diameter, wherein the transponder device has a plate-shaped conformation, and
wherein the first diameter of the cylindrical holding body and the third diameter of cylindrical dispensing head with the heat-shrinkable material and the transponder device are configured so that the transponder device cannot be dissociated from the cylindrical holding body without damaging the transponder device during an attempted withdrawal of the cylindrical dispensing head with the mounted transponder device and heat-shrinkable material from the cylindrical holding body.

13. The container as claimed in claim 12, wherein said transponder device includes a memory and an antenna.

* * * * *